June 2, 1925.
C. E. FOSTER
1,540,116
AUTOMATIC CHAIN APPLYING APPARATUS
Filed Oct. 24, 1921
2 Sheets-Sheet 1
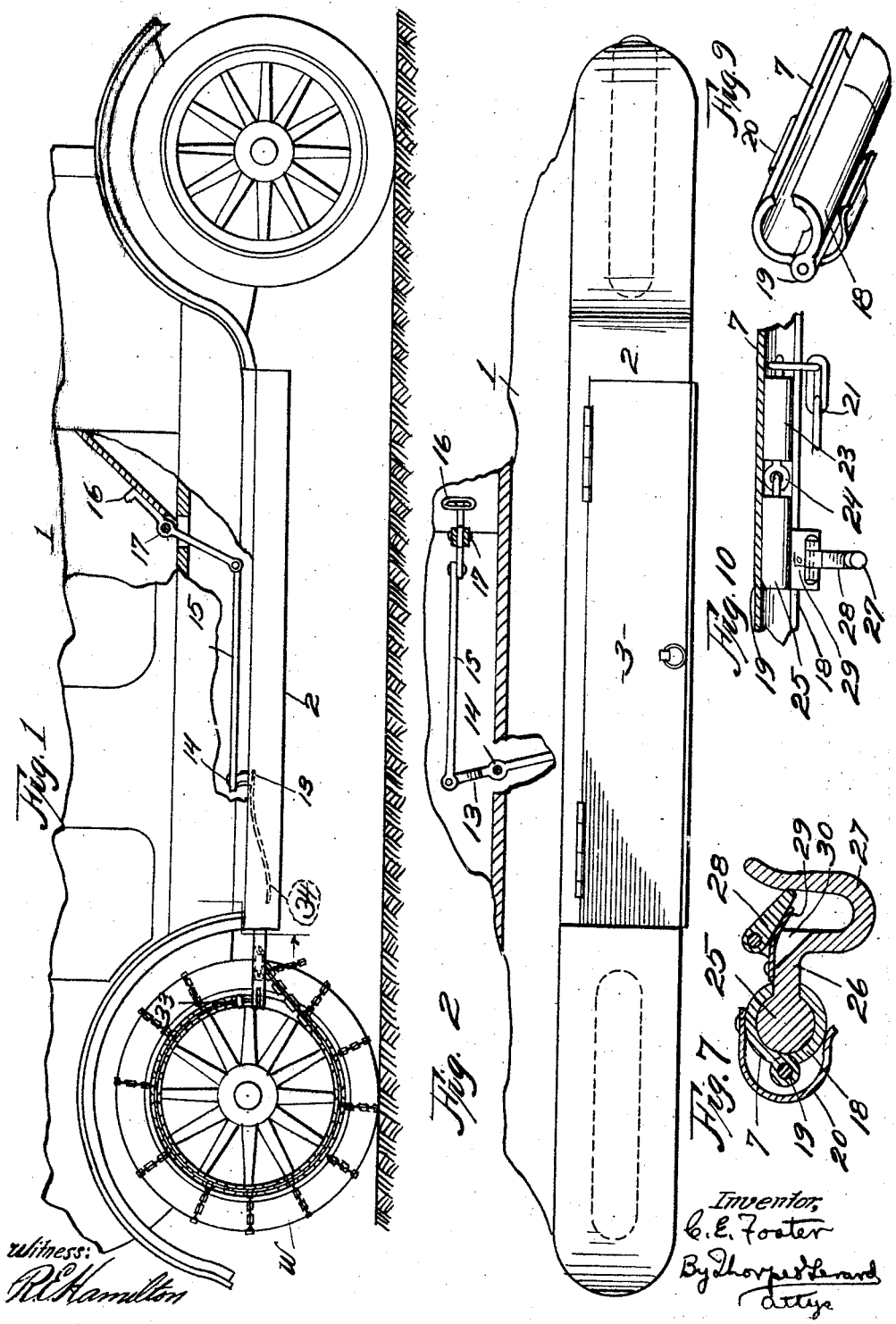

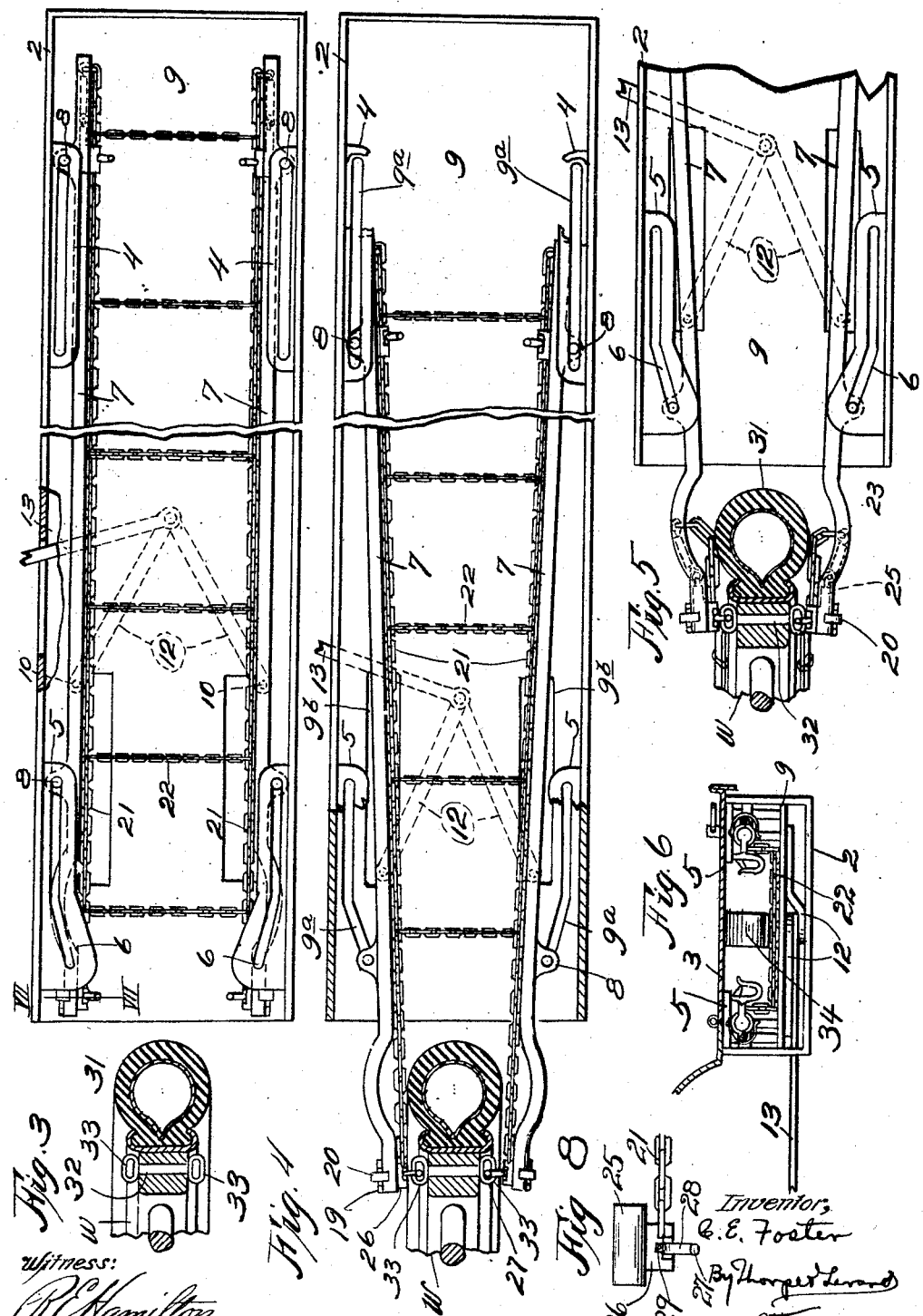

Patented June 2, 1925.

1,540,116

UNITED STATES PATENT OFFICE.

CHARLES E. FOSTER, OF INDEPENDENCE, MISSOURI.

AUTOMATIC CHAIN-APPLYING APPARATUS.

Application filed October 24, 1921. Serial No. 509,832.

*To all whom it may concern:*

Be it known that I, CHARLES E. FOSTER, a citizen of the United States, and resident of Independence, county of Jackson, State of Missouri, have invented a certain new and useful Improvement in Automatic Chain-Applying Apparatus, of which the following is a complete specification.

This invention relates to anti-skid chains and chain-applying mechanism for motor cars, and has for its object to provide means whereby the driver while seated in the car, can dispose the chains for the rear wheels in proximity to such wheels, and whereby the wheels when in forward motion, shall interlock with the chains at corresponding ends thereof, ride upon them until encompassed thereby, and finally secure them reliably in place by interlocking with their opposite ends.

A further object is to provide chambers in the running boards for holding the respective chains out of view but in extended condition and ready for disposition under the action of the driver, in proximity to the rear wheels preliminary to the application of the chains to the wheels.

A still further object is to produce appliances of the character set forth, which will operate efficiently and which are simple, strong and of comparatively inexpensive construction.

With the objects named in view, the invention consists in certain novel and useful features of construction and organization of parts as will hereinafter appear; and in order that it may be fully understood, reference is to be had to the accompanying drawings, in which:

Figure 1 is a fragmentary side view of an automobile provided with chain-applying equipment embodying the invention;

Figure 2 is a plan view of the same disclosure, with part of the car structure in horizontal section;

Figure 3 is an enlarged plan showing the hollow form of the running board with a chain and chain-adjusting equipment therein, and also shows a part of the respective rear wheel provided with chain-interlocking elements;

Figure 4 is a similar view showing the mechanism as positioned when the wheel is interlocked with the rear end of the chain extended within the running board chamber;

Figure 5 is a similar view with the parts arranged as the operation of applying the chain to the wheel, is about completed;

Figure 6 is an enlarged section taken on the line VI—VI of Figure 1;

Figure 7 is an enlarged cross section on the line VII—VII of Figure 3;

Figure 8 is a detail plan of the rear end of a chain;

Figure 9 is a perspective view of the rear end of one of the guides for the chain; and Figure 10 is a horizontal section through the front end of such guide with the corresponding end of the chain therein.

Referring now to the drawings in which corresponding reference numerals indicate corresponding parts, 1 indicates a motor car and 2 one of the running boards thereof, the said running board being hollow and provided for the greater part of its length with a hinged cover 3 whereby access may be had to the interior. Rigidly secured to the sides of the running board and occupying a position in the upper part of the chamber thereof are pairs of longitudinally slotted guide brackets 4 and 5, the brackets 4 being disposed near the front end of the running board and the brackets 5 near the rear end thereof, the slot of the rear pair of brackets having inwardly converging portions 6 for a purpose which is hereinafter explained.

Arranged within the chamber of the running board is a pair of channel bars 7 with their open sides or slots facing inwardly. These bars are disposed under the brackets and are provided with outwardly projecting lugs equipped with upwardly projecting pins 8 slidingly engaging the respective slots of said brackets. The lugs from which said pins project extend downwardly and rest upon a false bottom 9 of the running board which is provided with slots 9ª corresponding to the slots of said brackets 4 and 5. The slots 9ª are engaged by the lower ends of the pins 8 in order to cooperate with said brackets in affording a more stable and substantial guide for the bars 7 when the same are moved or adjusted as hereinafter explained. The false bottom is also provided with a pair of wide slots 9ᵇ for the accommodation of pins 10 depending from said bars, and pivotally connected at their rear ends to said pins are links 12 which, at their front ends, are pivoted to the inner end of a horizontal lever 13, said links and lever lying below the false bottom of the running board as shown most clearly by Figure 6. The lever extends through the guard spanning the space between the inner edge of the running board and the adjacent side of the car body as customary and at its inner end said lever is bent upward to the plane of and pivoted to the rear end of a link 15, pivoted at its front end to the lower end of a lever 17 extending up into the body and provided with a hand grip 16. The driver of the car can readily operate the lever and thus impart rearward or forward endwise movement to the bars 7, the converging portions of the rear slots 6 causing the bars rearwardly to converge in that direction. When the bars are moved forwardly they are brought back to the parallel relation in which they are shown in Figure 3, and in this connection it will be noticed that the rear ends of the bars are slightly bowed apart to provide a passage between them and the rear wheel W of the car, for the accommodation of the chain mechanism as hereinafter explained.

By reference particularly to Figures 7 and 9, it will be noted that the lower half of the channel bars 7 rearward of the bowed portions mentioned, are cut away, the openings thus produced being filled by hinged lower sections 18 disposed in line with the lower permanent halves of the bars as shown most clearly by Figure 9, the said sections being hinged as at 19 to the bars, and to hold said sections in alignment as mentioned, U-shaped springs 20 are secured to the bars and exert upward pressure against the undersides of said sections.

Tire chains of any suitable type with certain exceptions hereinafter noted, comprise the longitudinally extending portions 21 and the cross sections 22. Each chain is adapted to be arranged in extended condition within its respective running board as shown in Figure 3 and the major portion of the chain rests upon the false bottom 9 between the said bars 7. The front ends of the chains 21 extend into the channel bars and are linked as shown by Figure 10 to short push pins or plugs 23 fitting slidingly in said bars, and said push pins or plugs are linked as at 24 to similar pins or plugs 25, provided with neck portions 26 projecting through the open sides or slots of the channels and terminating in upwardly facing hooks 27, entrance to which is normally closed by pivoted dogs 28 actuated by springs 29 secured to the neck portions 26 and underlying the dogs, the said neck portions having notches 30 within which the springs can be depressed when the dogs are forced downwardly in a manner hereinafter explained. The rear ends of the chains 21 are also pivotally connected to the necks 26 of corresponding pins 25 at the rear ends of the channel bars, and said pins are likewise provided with the hooks and snaps as explained with respect to the pins and hooks at the front end of the chains.

In this connection, it is to be understood that the length of chain between the front and rear pins 25 is equal to the circumference of the tire, but as it is preferable to provide a small amount of slack so that the chain will not fit the tire too tightly, the length of chain between the front pin 25 and the pin 23 is in excess to the amount required to encircle the tire. The chain when secured in position, as will hereinafter appear, is thus provided with an amount of slack to guard against gripping the tire too tightly.

When the chains are in normal position, the bowed portions of the channel bars underlie the brackets 5, and when it is desired to effect the application of a chain to a wheel, the hand-lever 16 is operated to dispose the bars as shown by Figure 4, so that their bowed portions shall stand opposite the tire 31 of the wheels. The adjustment of the bars to the position mentioned effects like movement of the chain because the rear end pins 25 thereof are clamped firmly, though yieldingly by the spring 20 in the channel bars by the section 18 thereof. The adjustment of the channel bars disposes the snap-hooks 27 in proximity to opposite sides of the felly of the wheel, so that in the rotation of the latter, the cross-piece 32 mounted therein, causes its loops or eyes 33 to engage the snap-hooks, the dogs 28 yielding to permit the said loops to pass onto the snap-hooks and then reacting under the action of the springs 29 to make such engagement secure.

The operation of interlocking the rear ends of the chains with the loops 33 of the wheel is of course effected instantaneously and without checking the wheel movement, and the power of the latter applied downward on the snap-hooks, then overcomes the resistance of springs 20, by pressure of necks 26 on the upper edges of hinged sections 18, to open the latter and withdraw the rear pins 25 from the channel bars, the continuing movement of the wheel exerting force to draw the chain rearwardly through the running board, the successively emerging cross-chains 22 obviously engaging and draping across the tire, and the chains 21 taking positions at opposite sides of and in proximity to the felly as though fitted by hand. As the sudden application of pulling force applied by the wheel on the chain may tend to jerk the chain rearward and result perhaps in so kinking it as to interfere with its proper draping around the wheel, a retarding device is provided for preventing such result, this device being shown as a spring 34 secured to the door of the running board, and extending downward and rearward therefrom in the path of the cross-chains 22, as shown by Figures 1 and 6.

When the wheel has completed a revolution the chain is stretched tightly around it, too tightly for practical use as it would not only have a tendency, if too tight, to cut into the casing of the tire, but would be difficult of removal. To make provision for slackness in the chain when applied to the wheel, the front extremities of the chains 21, represented by the rear ends of the front set of pins 25, are attached to the push-pins 23 which normally occupy the channel bars forward of the connected pins 25 (see Figures 5 and 10). It will therefore be apparent that when the front set of pins 25 attain positions at the rear ends of the channel bars, the pins 23 occupy the bowed portions of the latter, and in this connection it should be stated that the bowing of the bars is to provide spaces large enough to permit the front snap-hooks to pass the tire without conflict, to the positions shown by Figure 5, the rear snap-hooks being so positioned by the bar adjustment and the front snap-hooks by the application of force exerted on the chains 21 by the wheel.

As the front set of pins 25 attain the positions shown by Figure 5, the completion of one turn of the wheels occurs and the loops 33 already engaged with the snap-hooks at the rear ends of the chains, engage, in like manner, the snap-hooks at the front ends of the chains, and pull the said pins out of the channels in the manner already described, the continuing movement of the wheels then drawing the pins 23 to the rear ends of the bars and withdrawing them therefrom in the same manner. As said pins are thus withdrawn, the slack, represented by the length of chain about equal to the combined length of the connected pins 25—23, (see Figure 1), is free to be taken up by the wheel and thereby guard against undue tightness of fit thereon. After the chains are applied the operator manipulates the lever 16, to draw the channel bars back into the running boards.

When the chains are unfastened and removed from the wheels, this being done by hand, the hinged tops of the running boards are raised, and the chains, in stretched condition are placed in the chambers, and then adjusted endwise to slip the rear set of pins endwise in the rear ends of the channel bars. The chains are then drawn forward enough to provide sufficient slack to permit the front set of pins 25 and 23, to be successively slipped into the front ends of the channels, the chains being then drawn rearward to dispose the rear set of pins within those portions of the channels having the hinged sections 18 at the bottom, so that the snap-hooks of the last-mentioned pins shall be prepared, when the channel bars are shifted rearwardly, as hereinbefore explained, to take positions insuring engagement by the loops or eyes 33 of the wheels.

From the above description it will be apparent that I have produced a construction embodying the features of advantage set forth as desirable in the statement of the objects of the invention, and it is to be understood that the right is reserved to make such changes as fall within the spirit and scope of the appended claims.

I claim:

1. The combination with a motor car having a chambered running board forward of a rear wheel, said wheel being provided with loops at its opposite sides, of a pair of spaced channel bars within the running board, a tire chain stretched within said chamber and slidingly engaged at its ends with said bars, and provided at each end with a pair of snap-hooks, and means for adjusting said bars rearwardly to dispose their rear ends at opposite sides of the felly of the said wheel, with the rear snap-hooks in the path of rotation of the loops of said wheel.

2. The combination with a motor car having a chambered running board forward of a rear wheel, said wheel being provided with loops at its opposite sides, of a pair of spaced channel bars within the running board, a tire chain stretched within said chamber and slidingly engaged at its ends with said bars, and provided at each end with a pair of snap-hooks, means for adjusting said bars rearwardly to dispose their rear ends at opposite sides of the felly of the said wheel, and pin-and-slot connections between the running board and bars to cause the latter to assume a rearwardly-converging relation when moved rearwardly to dispose the snap-hooks in the path of rotation of said loops; said bars having outwardly-bowed portions to guide the front snap-hooks to points beyond the inner portion or bead of the tire of the wheel without conflict with such tire, through a rearward pull applied on the chain by the wheel when the rear snap-hooks are engaged with the said loops.

3. A tire chain comprising longitudinal strands and cross strands connecting the longitudinal strands; pins having inwardly-projecting necks equipped with snap-hooks, secured to corresponding ends of said longitudinal strands, pins attached to the opposite ends of said strands, and pins linked to the pins attached to the last-named ends of said strands, and provided with inwardly projecting necks equipped with snap-hooks.

4. The combination with a motor car having a chamber forward of a rear wheel, said wheel being provided with chain-engaging means at its opposite sides, of a pair of spaced horizontally-opposite guides within the chamber, a tire chain stretched within said chamber and slidingly engaged at its ends with said guides, means for adjusting said guides rearwardly to dispose their rear ends at opposite sides of said wheel, and means to dispose the guides in rearwardly-converging relation for disposing the rear and front ends of said tire chain in position for engagement with the chain-engaging means of the wheel.

5. The combination with a motor car having a chamber forward of a rear wheel, said wheel being provided with chain-engaging means at its opposite sides, of a pair of spaced channel bars within the chamber, each of said bars being provided with a pivoted section at its rear end, a tire chain stretched within said chamber and slidingly engaged at its ends in said channel bars, and means for adjusting said bars rearwardly to dispose their rear ends at opposite sides of the wheel, with one end of the tire chain in position for engagement with the chain-engaging means of the wheel; said pivoted sections of the bars functioning to permit the successive disengagement of the opposite ends of the tire chain from said channel bars.

In witness whereof I hereunto affix my signature.

CHARLES E. FOSTER.